United States Patent [19]
Cortner, Jr.

[11] 3,777,716
[45] Dec. 11, 1973

[54] LIVESTOCK DUSTING BAG

[75] Inventor: William C. Cortner, Jr., Lawrence, Kans.

[73] Assignee: Alley-Johnson Company, Kansas City, Mo.

[22] Filed: Jan. 28, 1971

[21] Appl. No.: 110,575

[52] U.S. Cl. .............................................. 119/159
[51] Int. Cl. ............................................ A01k 29/00
[58] Field of Search ........................... 119/159, 156; 401/200; 132/79 D, 82 B; 128/260; 206/10

[56] References Cited
UNITED STATES PATENTS

| | | | |
|---|---|---|---|
| 3,494,333 | 2/1970 | Mommer | 119/159 |
| 2,814,273 | 11/1957 | Dickens, Sr. | 119/159 |
| 3,364,900 | 1/1968 | Knapp | 119/159 |
| 3,563,209 | 2/1971 | Mommer | 119/159 |

FOREIGN PATENTS OR APPLICATIONS

412,744  7/1934  Great Britain

Primary Examiner—Hugh R. Chamblee
Attorney—Cushman, Darby, Cushman

[57] ABSTRACT

A self-dusting cartridge loading protected livestock applicator comprising an inner porous bag having filling means and flexible protective material substantially surrounding and secured to the bag. The flexible protective material extends below the inner porous bag forming folds which curl upward toward the bottom of the inner porous bag and preferably extend upward with a porous material that contacts and transfers dust from the inner bag to itself and to an animal. The applicator is constructed so that when it is agitated by an animal the guard or protective flaps cause dust to be dispensed on the agitating animal and at the same time provide some protection to the more vulnerable inner bag.

43 Claims, 11 Drawing Figures

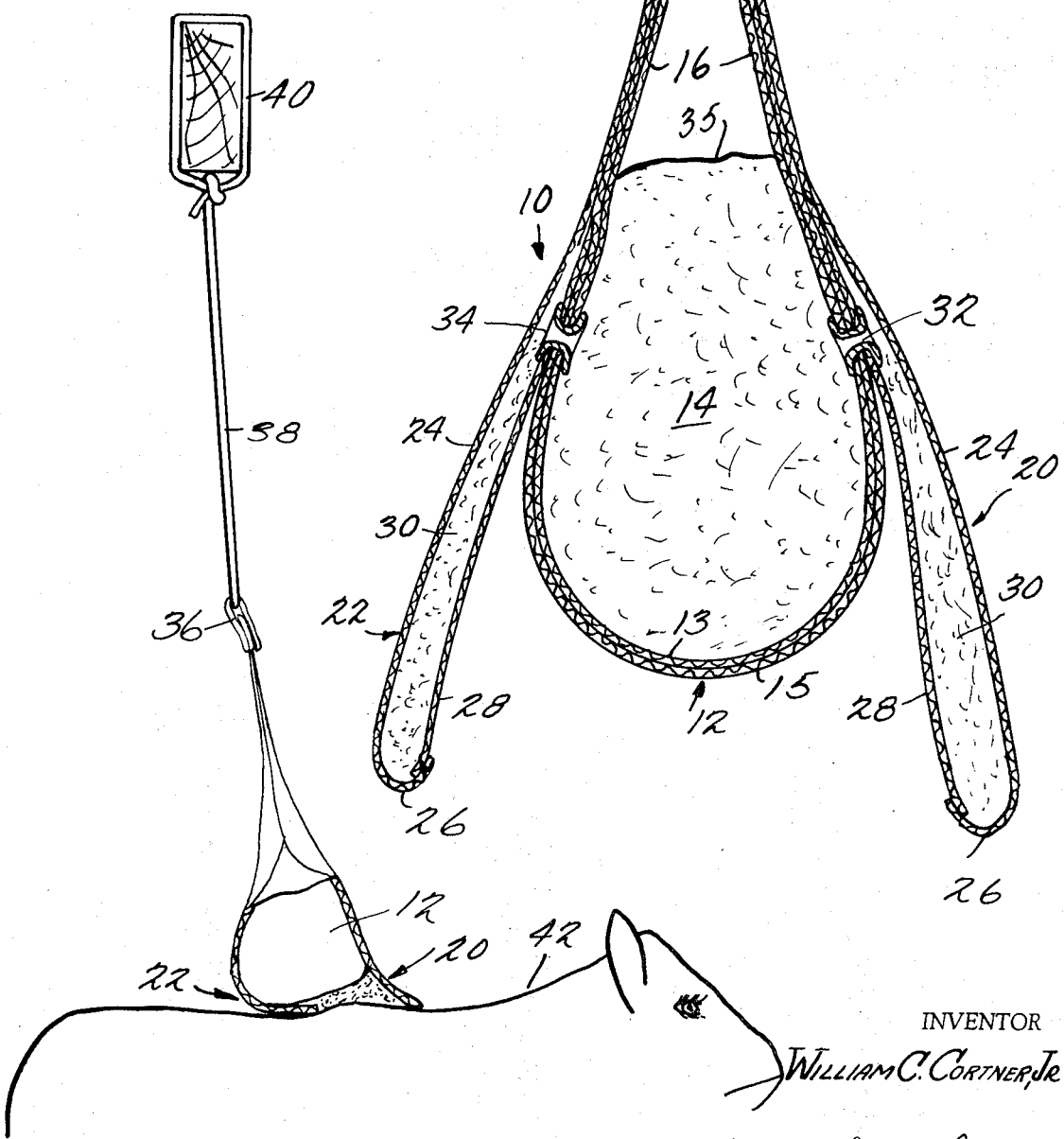

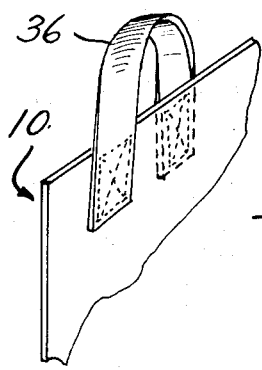
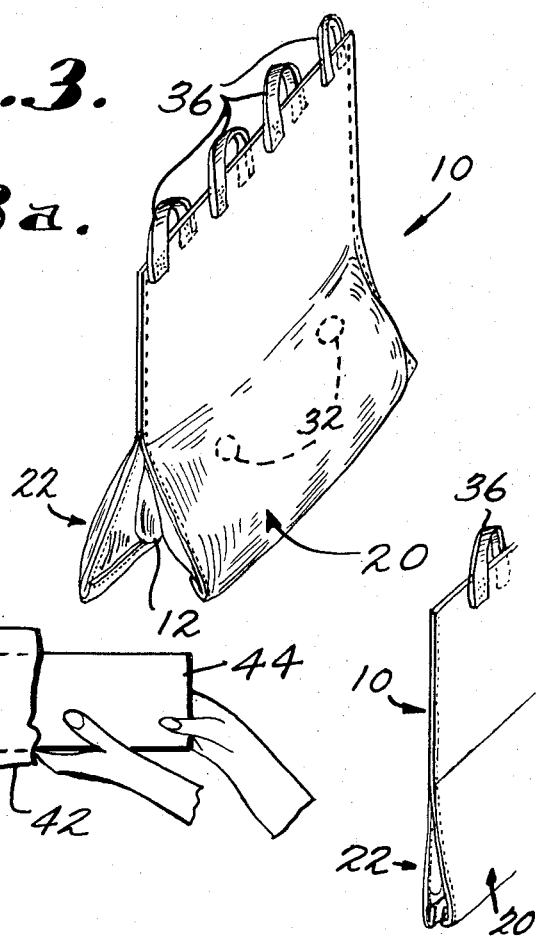
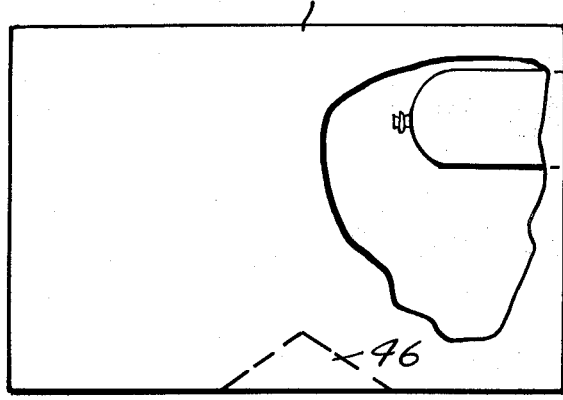
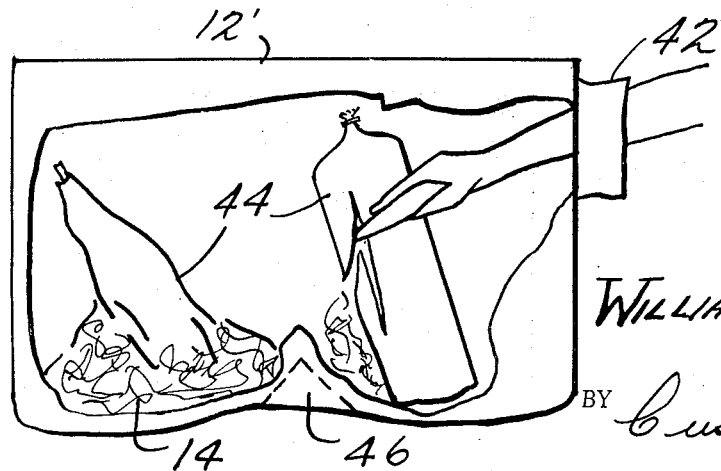

INVENTOR
WILLIAM C. CORTNER, JR.
BY Cushman, Darby & Cushman
ATTORNEYS

LIVESTOCK DUSTING BAG

This invention applies to an applicator for dusting livestock with insecticide powders or dust as the animal passes beneath the applicator.

It is well known that livestock are frequently troubled with various types of insects such as flies, ticks, lice, etc. which prey upon them causing irritation which results in interference of the animal's grazing and feeding. This interference can result in a loss of weight, decrease of milk production or impairment of the hide.

In the past there have been several conventional ways that this pest problem has been dealt with. One conventional way was to individually treat each animal by hand, which is an expensive method of treatment due to the individual cost of the labor involved. Additional treatments that have also been used are in the form of dust bags which are supported by various means. These dust bags are usually simple burlap type bags, or other more sophisticated bags that use poly type materials around the bag to protect them from moisture. The useful life of such bags has been limited due to the fact that the bag material has a tendency to easily become clogged with the dirt, saliva, feed and natural oils that accumulate on the bag when animals come into contact with them.

The present invention is an improvement over previous dust applicators and is constructed with an outer layer of heavy flexible material substantially encompassing and secured to an inner porous bag so that the edges of the outer heavy flexible material extend down and under the inner porous bag forming folds. The fold arrangement acts as a protective guard flap in two ways.

1. It protects the more vulnerable inner dust carrying bag from the abuse of the cattle agitating the bag and also absorbs or collects much of the foreign matter from the cattle preventing the foreign matter from plugging the porous inner dust carrying bag.

2. It offers protection of the inner dust carrying bag from the elements and due to the heavy outer cover, the inner dust carrying bag is in a sense hanging in deep shade and the sun's ultra violet penetration is greatly reduced. This configuration also offers some protection from wind and moisture.

Preferably, the heavy flexible material forms an outer bag lined in the inside with porous material for receiving and also applying dust to the using animal. This outer bag has the feature of exposing a greater dusting area when agitated since it is split part way up both it's outer ends and depending on the direction or angle of the blow struck offers protection to the inner dust carrying bag.

The normal use of the present invention lends itself to a longer serviceable life than a conventional applicator or bag which comes into contact with moisture, dirt and other clogging materials as well as the ultra violet rays of the sun, causing it to rot. Consequently, the present invention's improved construction and material composition enable it to be used longer than conventional dust bags. In fact, the present invention can be reused, as a refiller valve or spout is incorporated in the construction of the inner dust bag of the applicator which allows the user to conveniently refill the bag, thus lowering the cost per pound of dust dispensed.

These and other objects and advantages of the invention will appear more clearly from the following specifications in connection with the accompanying drawings in which:

FIG. 1 shows a hung self-dusting livestock applicator, partially diagrammatic and partially in cross section, being agitated by an animal to release the dust upon the animal;

FIG. 2 shows an enlarged cross-sectional view of the self-dusting livestock applicator of FIG. 1;

FIG. 3 is a perspective view of the self-dusting livestock applicator shown in FIG. 1;

FIG. 3a is an enlarged view of a portion of FIG. 3 and shows the strap detail;

FIG. 3b is a partial view of FIG. 3 and shows how the guard flaps conform back to the vertical after agitation by livestock;

FIG. 4 is a partial cutaway side view of an inner dust bag showing the insertion of insecticide cartridges into the inner dust bag;

FIG. 5 is a partial cutaway side view of an inner dust bag showing the perforation of the insecticide cartridges inside the inner dust bag;

Figure 6:
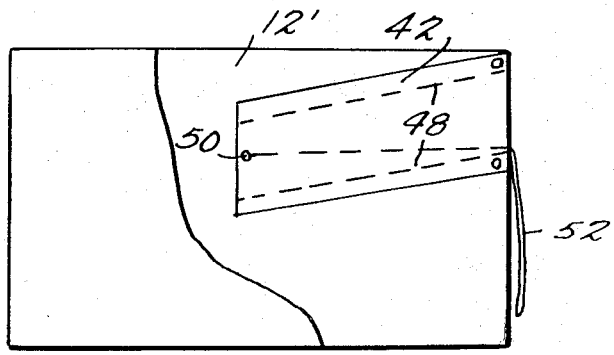
FIG. 6 is a partial cutaway side view of an inner dust bag showing the filler valve tucked inside before filling.
Figure 7:
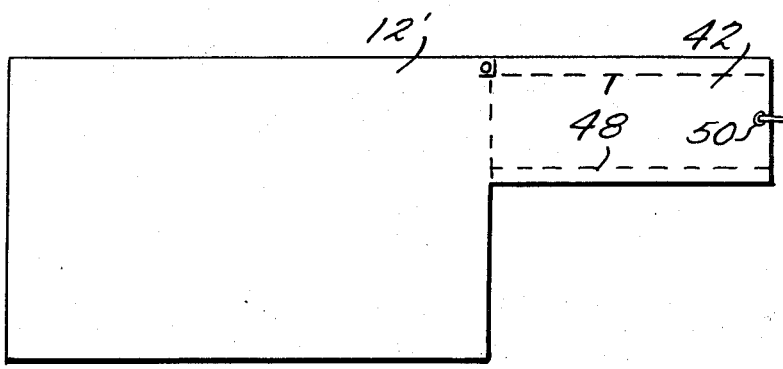
FIG. 7 is a side view of an inner dust bag showing the filler valve pulled out for filling purposes.
Figure 8:
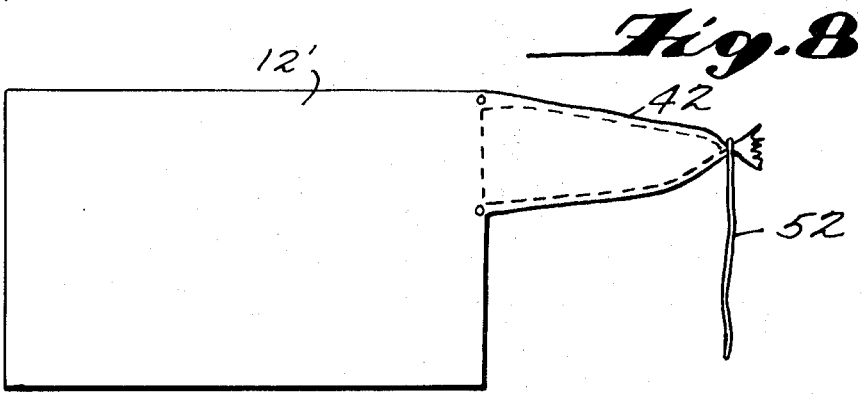
FIG. 8 is a side view of the inner dust bag of FIG. 7 showing the filler valve tied after filling.
Figure 9:
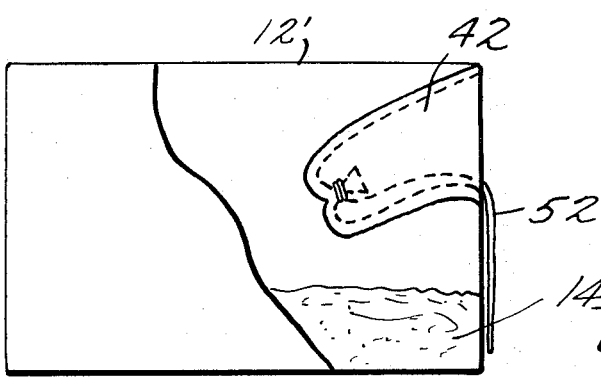
FIG. 9 is a partial cutaway side view of the FIG. 8 bag showing the closed filler valve inserted in the inner dust bag after the bag has been filled with insecticide dust.

The unique, cartridge loading livestock dusting bag or applicator 10 in FIGS. 1, 2 and 3 includes an inner porous dust storing and dusting bag 12, and as shown is filled with insecticide dust or powder 14. Preferably, bag 12 consists of two layers of burlap or, e.g., one inner layer 13 of burlap and an outer layer 15 of polyester woven material. Bag 12 is closed at both ends and its sides 16 extend upwardly toward each other to a closen top end 18. With this arrangement, several important advantages are obtained. First, the inner layer 13 of burlap carries little or no weight of the dust 14 since it is supported by the outer layer 15. Second, the burlap layer 13 or layer 15 does not come into contact with the saliva, feed, water, dirt, hair and oils or other foreign material from the cattle which ordinarily would result in clogging of the burlap layer as the outer guard flaps protect them.

The inner bag 12 is fully protected from weather by two guard flaps 20 and 22 on opposite sides of bag 12. As indicated in FIG. 3, these flaps not only fully cover both sides of bag 12 but also extend substantially beyond the opposite ends of the bag to effect a substantial cover of bag 12 all the way around. Flaps 20 and 22 include an outer wall 24 which is of flexible material, for example cloth, burlap if desired, covered with a suitable heavy flexible material. Each outside wall provides skirt means which extends considerably below the bottom of bag 12, for example a distance about equal to one-half the maximum width of bag 12 when filled, and at its lower end curls inward and upward to make a U-shaped drip cap 26 for keeping moisture and foreign matter away from the inner bag 12. That is, any moisture on outer wall 24 runs down the wall and drips off at its lower end 26, thereby preventing moisture from coming into contact with bag 12 during use of the dust applicator 10 by wet livestock as shown in FIG. 1.

Flaps 20 and 22 preferably include an inner wall 28 forming each flap into an outer bag the ends of which are sewn shut or otherwise secured together and the interior of which also contains insecticides dust 30, which may be transferred thereinto from bag 12 in either or both of two ways. For example, direct, open transfer channel means such as grommets 32 and 34 may be disposed through apertures in opposite side walls 16 of inner bag 12 and respective inner walls 28 of the outer bags 20 and 22, approximately half way between the bottom of bag 12 and the normal fill level 35 of dust 14 therein. Of course, there may be more grommets per side than the two grommets 32 shown in FIG. 3. In addition to such grommet transfer means, or instead thereof, inner walls 28 may each be made of porous material, such as burlap cloth, whereby transfer of dust from the inner storage bag 12 to the guard flaps or outer bags 20 and 22 takes place automatically upon contact between bag 12 and inner walls 28 during use of applicator 10.

As more particularly shown in FIG. 2, outer wall 24 also extends upwardly along side walls 16 of bag 12, and forms a protective top cover, with the inner and outer bag walls being secured together in any desired manner, as by several straps that also provide the means for the complete assembly to be hung with an rope from a over head structure. These straps are staggered in their attachment to opposite sides of the bag so that each single strap offers two bearing points. In the case of four straps, eight bearing points are effected and dispersement of weight is reduced per bearing point and the weight of the hanging bag is evenly spread the length of the protective top.

As above indicated, burlap cloth is a preferable porous material for inner layer 13 on inner bag 12 and inside flap walls 28, but of course any other porous material may be used as long as it will sufficiently convey the powder or dust to the animal. Any desirable heavy flexible material can be employed on the outer walls 24 (guard flap 26).

In operation, the dust applicator 10 is hung so that the lower, guard flap ends 26 are six to eight inches below the back line of the animal 42 to be dusted. As the animal passes under the applicator, contact is first made with the flexible outer side 24 of the leading flap 22, pushing the inner side 28 thereof against the inner bag 12 which contains the insecticide dust. This transfers dust into bag 22 via grommet 34 if such exists and/or via the pores in bag 12 and side wall 28 (if the latter is porous as is preferred). As the animal passes on under the applicator, contact is made with the inner wall 28 of the other guard flap or outer bag 20, and assuming that it has already been charged with dust, and since it hangs below the bottom of the inner bag 12, it drags across the head and back line of the animal, dusting as it passes. During this process, dust is also emitted from the inner bag 12 directly onto the animal. In use, the combination of the exposed dusting area of the inner bag and the guard flap dusting walls 28 have a greater exposed dusting surface and consequently a greater efficiency and a better dusting potential, than a conventional bag, since the side flaps or bags of the present invention are constantly being charged and emitting dust along with the main bag 12. Dusting of an animal is also accomplished when it stands beside the bag and bucks and tosses it with its head. It will be realized that the arrangement of the dust bag of the present invention protects the bag 12 from much of the stress and wear resulting from animal contact since, as most blows from the animal's horns or head are usually directed upwardly, the guard flaps 20 and 22 will conform to the bottom side of the dust bag 12 and absorb the blows from the animals. Moreover, as shown in FIG. 1, when an animal passes under the dust bag, the leading guard flap first comes into contact with the animal and folds under the dust bag 12 to absorb most of the oil, dirt and other clogging materials and functions to keep the dust bag 12 out of contact with the animals.

In an embodiment wherein grommets 32 and 34 are employed, two or more such transfer grommets being preferably used on each side of the bag, the outer dust flaps 20 and 22 are immediately charged by the dust 14 inside bag 12 upon hanging of the applicator in place. As the top level of the dust drops below the grommet level, the lifting action caused by livestock using the applicator raises the bottom level of the dust allowing the transfer grommets 32 and 34 to function until almost if not all of the dust is used.

If desired, the weatherproof dust bag of this invention may be used as a throwaway item. That is, once its contents have been used, a new bag may be hung in its place.

Alternatively, since the protection provided by this invention gives the applicator 10 a much longer serviceable life than a conventional bag that rots from moisture and the ultraviolet rays of the sun, refill provisions are desirable. As shown in FIGS. 4–9, inner bag 12′ has a flexible filler valve or spout 42 through which insecticides may be inserted. This bag can be filled at the dusting location, with an insecticide dust cartridge 44 being inserted into the bag through spout 40. The dust applicator may be shipped with or without one or more insecticide cartridges. FIG. 4 shows the insertion of one such cartridge into bag 12′ and when the operator needs to use the dust applicator, he reaches through the spout 42 and punctures or slits the cartridge or cartridges as shown by FIG. 5. Dust or insecticide then spills out into the applicator and the action of the animal bumping the bag will cause the contents thereof to be dispensed during the self-dusting operation by the animal.

When more than one cartridge 44 is used, as shown in FIG. 5 the middle bottom portion of bag 12 is preferably sewn in a manner to cause a V void 46 to remove weight from center of bag. This eliminates sagging of the dust bag in the center causing the bottom to be level.

FIGS. 6 and 7 show the details of the filler valve or spout 42 with its support stitching 48, eyelet 50 and valve tie cord 52. When the bag is filled with an insecticide cartridge the inner bag 12′ is closed as shown in FIG. 8 by tieing the valve tie cord 52 around the ends of the filler valve or spout 42 and then the valve is pushed inside the bag with the pull cord 52 hanging outside thereof if desired, as shown in FIG. 9. Any other type of closure means may of course be utilized to close the end of the filler valve or spout 40.

Thus, it has been shown that all of the objects and advantages of this invention heretofore discussed have been carried forth by the construction and operation of the novel cartridge loading livestock dusting applicator above described. Further objects and advantages, and even other embodiments of this application, will become apparent to those of ordinary skill in the art upon reading the foregoing disclosure. However, it is to be understood that such modifications and variations are considered to be within the purview and scope of the present invention as defined by the appended claims.

I claim:

1. A protected self-dusting livestock dust applicator comprising:
    an inner porous storing and dusting bag,
    outer means of flexible material on each side of said inner bag secured with and extending below and covering said inner bag sufficiently to provide complete protection for keeping moisture and foreign matter away from said inner bag, and
    said outer means being elongated bag means providing skirt means and including means for transferring dust from said inner bag to said outer bag means, said skirt means having an inner dispensing portion.

2. An applicator as in claim 1 wherein said transferring means includes porous inner wall means for said outer bag means.

3. An applicator as in claim 1 wherein said transferring means includes at least one open channel on each side of said inner bag means connecting with said outer bag means for dust flow therethrough.

4. An applicator as in claim 1 wherein said inner porous bag has an inner wall of woven burlap material and an outer wall of polyester woven material.

5. An applicator as in claim 1 wherein said inner porous bag has filling means at one end extendible through said outer bag means.

6. An applicator as in claim 5 wherein said filling means comprises a filling valve having closure means.

7. An applicator as in claim 6 wherein said closure means is a cord.

8. An applicator as in claim 1 wherein said inner porous bag contains at least one insecticide cartridge.

9. An applicator as in claim 1 wherein said outer means has an exterior at least in its lower portions of heavy, flexible, weatherproof, cloth-like material that can withstand livestock abuse and protect said inner bag therefrom.

10. A protected self-dusting livestock dust applicator comprising:
    an inner porous storing and dusting bag,
    outer flexible bag means having outer and inner walls overly covering and extending substantially below said inner bag,
    said outer wall being constructed of flexible weatherproof material and sufficiently covering said inner bag to provide complete protection therefor, and
    said inner wall being at least partially constructed of flexible porous material for receiving dust from said inner bag and assisting said inner bag in the application of dust to said livestock.

11. A self-dusting livestock applicator as in claim 10 wherein the bottom of said protective outer wall curls inward and upward and connects with the said flexible porous material of said inner wall to form moisture drip means and foreign matter protection.

12. An applicator as described in claim 10 wherein said inner wall has transfer means connecting it to said inner porous bag allowing dust to flow therethrough.

13. An applicator as in claim 12 wherein said transfer means is at least one grommet.

14. An applicator as in claim 10 wherein said inner porous bag has a plurality of walls.

15. An applicator as in claim 10 wherein said inner porous bag has an inner wall of woven burlap material and an outer wall of polyester woven material.

16. An applicator as in claim 10 wherein said outer flexible material has a plurality of layers.

17. An applicator as in claim 16 wherein said outer flexible material has an outer layer of protective material.

18. An applicator as in claim 10 wherein said inner porous bag has filling means.

19. An applicator as in claim 18 wherein said filling means comprises a filling valve having closure means.

20. An applicator as in claim 19 wherein said closure means is a cord.

21. An applicator as in claim 10 wherein said inner porous bag contains at least one insecticide cartridge.

22. An applicator as in claim 10 wherein said inner porous bag has inner and outer layers of burlap.

23. A method for loading insecticide in self-dusting livestock applicators comprising the steps of:
    placing at least one sealed insecticide container inside said applicator,
    reaching inside said applicator with a perforating tool, and
    perforating at least said one sealed insecticide container inside said applicator so that insecticide is deposited within said applicator.

24. A method as in claim 23 wherein each said applicator includes a bag which has a central internal hump in its bottom, and said method includes the step of depositing insecticide from at least said one perforated container on at least opposite sides of said hump to prevent central sag of said bag.

25. A method as in claim 23 wherein each said applicator includes an inner porous storing and dusting bag having a flexible filler valve, said bag being substantially overly covered by an outer flexible material including a skirt portion covering said valve and extending substantially below the bottom of said bag for fully protecting said bag from the livestock and foreign matter and weather,
    said method including the initial steps of:
    moving said skirt portion to secure access to said valve,
    pulling said valve exteriorly of said skirt portion, and
    opening said valve;
    the aforesaid container placing and tool reaching steps including manually inserting said sealed insecticide container and tool through said valve opening into the interior of said inner bag,
    said method further including after said perforating step the steps of:
    closing said valve, and
    returning said valve and skirt portion to their original positions to recover said valve.

26. A method as in claim 25 wherein said flexible filler valve is a tube of flexible material that normally is tied and said opening and closing of the valve respectively includes untying and retying said tube.

27. A method as in claim 25 wherein said flexible filler valve is a tube of flexible material that normally is tied and tucked internally of said inner bag and said pulling step includes removing said tube from its tucked-in position so as to extend outwardly, said opening and closing of the valve respectively includes untying and retying said tube, and said valve returning step includes tucking the tied tube back into said inner bag.

28. A protected self-dusting livestock dust applicator comprising:
   an inner porous storing and dusting bag having bottom and side portions for dispensing dust, and
   outer means of flexible weatherproof material substantially overly covering said inner bag and secured therewith and providing skirt means extending substantially below the said bottom portion of said inner bag a distance of approximately half the width of the bottom portion of the bag when the bag contains dust to allow substantial fold of any portion of said skirt means under said bag to provide protection to said inner bag from use by livestock including mishandling thereby and from foreign matter and moisture.

29. An applicator as in claim 28 wherein a central partially void portion of the bottom of said bag is provided to prevent central sagging of the bag during use.

30. An applicator as in claim 28 wherein said skirt means is comprised of outer guard flaps respectively positioned on opposite sides of said inner bag and having terminating separate ends extending beyond the ends of said inner bag.

31. A livestock dust applicator as in claim 28 and further including:
   means for causing a hump in the central area of the bottom of said inner dusting bag to prevent central sag of said bag bottom when filled with said dust.

32. A livestock dust applicator as in claim 28 and further including:
   flexible tube filler valve means connected to said inner bag and extendible to the exterior of said outer flexible material when said skirt means is appropriately moved for receiving a dust cartridge.

33. A livestock dust applicator as in claim 32 wherein said flexible tube valve means is normally disposed inside said inner bag in a tucked-in position, said applicator further including:
   tie means for tying the end of said flexible tube valve means and for pulling the valve means from its said tucked-in position when it is desired to extend the valve means exteriorally of said outer flexible material.

34. An applicator as in claim 28 wherein said inner porous bag has a plurality of walls.

35. An applicator as in claim 28 wherein said outer means includes an inner layer which is at least partially constructed of flexible porous material for receiving dust from said inner bag and assisting said inner bag in the application of dust to said livestock.

36. An applicator as in claim 28 wherein said inner bag includes means for preventing sagging of said inner bag when the latter contains said dust.

37. An applicator as in claim 28 wherein said inner porous bag has an inner wall constructed of porous burlap material and an outer wall constructed of porous plastic material.

38. An applicator as in claim 37 wherein said porous plastic material includes a woven polyester material.

39. An applicator as in claim 28 wherein said outer means of flexible waterproof material has an exterior at least in its skirt means portion of heavy flexible, weatherproof cloth-like material that can withstand livestock abuse and protect the inner bag therefrom.

40. A protected cartridge loading self-dusting livestock dust applicator comprising:
   an inner porous storing and dusting bag,
   outer flexible weatherproof material substantially overly covering said inner bag and extending substantially below the bottom of said inner bag sufficiently to provide protection therefor from foreign matter, moisture and livestock use and misuse, and
   means for causing a hump in the central area of the bottom of said inner dusting bag to provide on opposite sides of said hump well areas for receiving said dust and preventing central sag of said bag bottom.

41. A protected cartridge loading self-dusting livestock dust applicator comprising:
   an inner porous storing and dusting bag,
   outer flexible waterproof material substantially overly covering said inner bag and extending substantially below the bottom of said inner bag sufficiently to provide complete protection therefor from foreign matter, moisture and livestock use and misuse, and
   flexible tube filler valve means connected to said inner bag and extendible to the exterior of said outer flexible material to receive a said dust cartridge upon appropriate movement of the latter, said valve means being normally disposed inside said bag in a tucked-in position, and
   tie means for tying the end of said flexible tube valve means and for pulling the valve means from its said tucked-in position when it is desired to extend the valve means to the exterior of said outer flexible material to receive said dust cartridge.

42. A protected cartridge loading self-dusting livestock dust applicator comprising:
   an inner porous storing and dusting bag,
   outer flexible waterproof material substantially overly covering said inner bag and extending substantially below the bottom of said inner bag sufficiently to provide complete protection therefor from foreign matter, moisture, and livestock use and misuse, and
   flexible tube filler valve means connected to said inner bag and covered by but extendible to the exterior of said outer flexible material to receive a said dust cartridge upon appropriate movement of the latter, and
   tie means for tying the end of said flexible tube valve means.

43. A protected self-dusting livestock dust applicator comprising:
   an inner porous and storing dusting bag having bottom and side portions for dispensing dust, and
   outer means of flexible waterproof material substantially overly covering said inner bag and secured therewith and providing skirt means extending substantially below the said bottom portion of said inner bag sufficiently to allow substantial fold of any portion of said skirt means under said bag to provide protection to said inner bag from use by livestock including mishandling thereby and from foreign matter and moisture,
   said outer means having its lower portion formed by an inward and upward turn to make a U-shaped dripper for keeping moisture away from said inner bag.

\* \* \* \* \*